United States Patent [19]

Lewis

[11] 4,304,627

[45] Dec. 8, 1981

[54] EXPANDABLE CHAMBER FUSION REACTOR SYSTEM

[75] Inventor: John G. Lewis, Ann Arbor, Mich.

[73] Assignee: Texas Gas Transmission Corporation, Owensboro, Ky.

[21] Appl. No.: 946,519

[22] Filed: Sep. 28, 1978

[51] Int. Cl.³ .............................................. G21B 1/00
[52] U.S. Cl. .................................. 376/148; 376/147; 376/152; 376/103
[58] Field of Search .......................... 176/1, 2, 3, 9, 39; 60/632, 637

[56] References Cited

U.S. PATENT DOCUMENTS

| | | | |
|---|---|---|---|
| 3,125,492 | 3/1964 | Baker | 176/7 |
| 3,549,490 | 12/1970 | Moore | 176/39 |
| 3,624,239 | 11/1971 | Fraas | 176/9 |
| 3,762,992 | 10/1973 | Hedstrom | 176/1 |
| 3,921,405 | 11/1975 | Rosciszewski | 176/9 |
| 4,023,065 | 5/1977 | Koloc | 176/3 |
| 4,064,024 | 12/1977 | Lee | 176/9 |
| 4,132,727 | 1/1979 | Gomberg | 176/9 |

FOREIGN PATENT DOCUMENTS 2056199 5/1972 Fed. Rep. of Germany .......... 176/1
2449230 5/1975 Fed. Rep. of Germany .......... 176/9

OTHER PUBLICATIONS

Sixth Symposium on Eng. Prob. of Fus. Res. pp. 983–987 Tunchi et al., 176—1.
Chem. Eng. News vol. 1, No. 2, pp. 32–47 4/2/79 Dingee.

Primary Examiner—S. A. Cangialosi
Attorney, Agent, or Firm—Laurence R. Brown

[57] ABSTRACT

A piston is moved by a laser incited fusion reaction such as deuterium-tritium (D-T) to thereby produce an expandable fusion chamber. When a gaseous substance such as $CO_2$ is presented in the presence of the fusion reaction, it is dissociated into CO and $O_2$ component mixture and the expansion of the chamber rapidly cools the mixture and quenches the back reaction thereby producing a greater CO yield. Also the piston produces peripheral power from the fusion reaction in the form of mechanical energy.

18 Claims, 8 Drawing Figures

4,304,627

EXPANDABLE CHAMBER FUSION REACTOR SYSTEM

This invention relates to fusion reactors and more particularly it relates to expandable chambers supporting a D-T reaction.

BACKGROUND OF THE INVENTION

Laser incited thermonuclear fusion reactions have been produced in practice for some time in laser fusion reactor systems yielding significant neutron radiation. These systems basically present fusion fuel pellets in a central reactor chamber and focus a laser beam thereon to explode the pellets one at a time.

It has been proposed to introduce a gaseous compound such as $CO_2$ into the central chamber for dissociation into desired part CO by the energy from a D-T reaction. Output cooling and quenching of the dissociated elements or compounds by rapid expansion of the volume of gas leaving a fusion chamber has been proposed by Theodor Teichmann in the copending application Ser. No. 414,367 filed Nov. 9, 1973, for example. However, these techniques rely upon the reaction pressure waves directly to carry the product gases out of a fixed volume chamber through a diffusing funnel for cooling upon exit from the chamber.

Additionally, it has been proposed that pressure and rarefaction waves of the pellet explosion itself be used to actuate inlet and discharge valve of the central chamber.

However, it has not heretofore been proposed that the central chamber itself be expandable to more quickly cool and quench the residue gases by rapid expansion of chamber volume or to provide longer life of the central fusion chamber. Neither has it been proposed heretofore that a fusion reaction be used with individual pellet fuel injections to power D-T reaction explosions within a central chamber in the form of a cylinder having a reciprocating piston movable therein and the individual explosions timed to operate in a manner analogous to an internal combustion engine.

BRIEF DESCRIPTION OF THE INVENTION

Thus, a preferred embodiment of this present invention proposes to explode fuel pellets in a D-T reaction with laser energy within the cylinder of a reciprocating engine. This engine is termed an expansion engine which is also used to process a gas such as $CO_2$ dissociated by the energy from a D-T reaction into materials C and $O_2$ and by rapid volumetric expansion to cool and quench the dissociated elements before they can recombine. The engine will also serve as a pump for moving processed gases into and out of the central chamber and will produce additional energy in the form of mechanical energy from a mechanism coupled to the reciprocating engine.

OBJECTS OF THE INVENTION

It is a general object of the invention to improve the state of the art in utilizing fusion reactions ignited by laser energy.

One more specific object of the invention is to produce D-T reactions in an expandable central chamber.

Another object of the invention is to process gases in the presence of D-T reactions to recover dissociated parts thereof.

Still another object of the invention is to provide a reciprocating engine powered by explosion of fusion pellets producing a D-T reaction.

THE DRAWING

Other objects, features and advantages of the invention will be found throughout the following specification, which makes reference to the accompanying drawing, wherein all figures are referenced by typical dimensions, and:

DETAILED DESCRIPTION OF THE INVENTION

Figure 1:
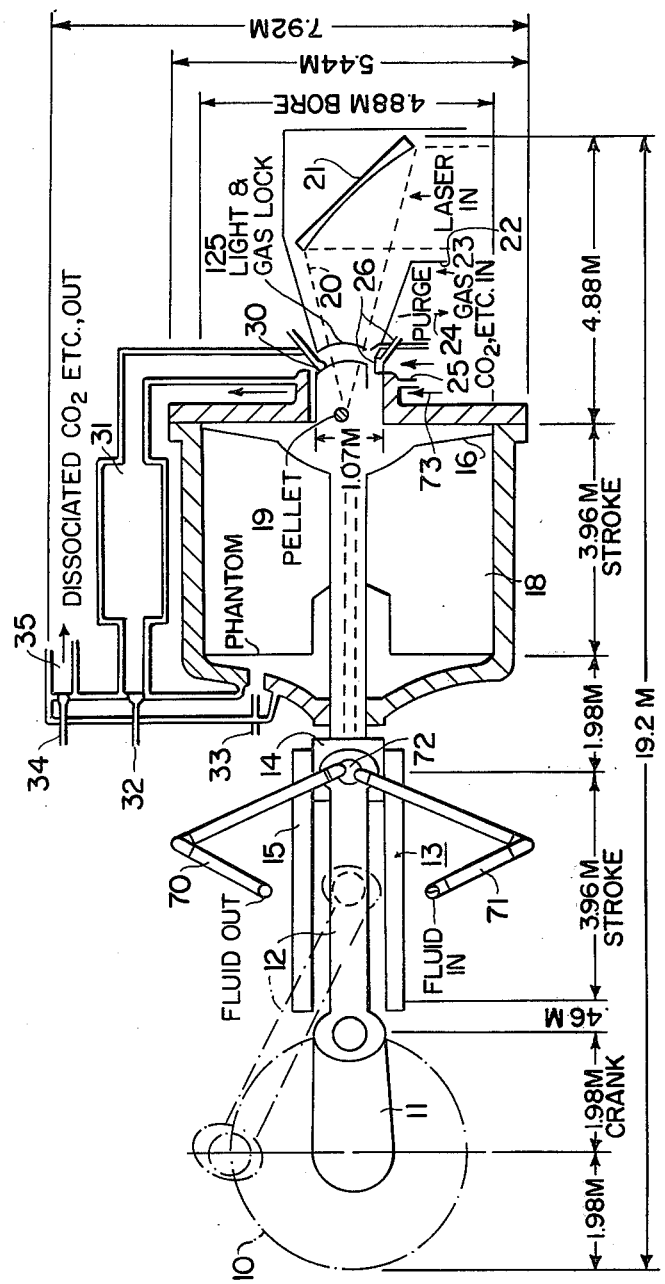
FIG. 1 is a system sketch illustrating a reciprocating engine powered by fusion pellet explosions representing the preferred embodiment of the invention known at the time of filing of this application.

Typical dimensions are associated with the engine embodiment set forth in FIG. 1, where the path 10 of rotating crank 11 is shown in phantom as well as the intermediate position of piston rod 12 in its stroke. The piston rod 12 extends laterally through a clearance slot 15 in a guide tube 13 retaining the bearing member 14 over the piston stroke length.

The piston 16 reciprocates between its shown phantom and solid line limiting position within cylinder 18 under power of individually fed fusion pellets 19 exploded by a laser beam focused at rays 20 by a concave focussing mirror 21 to produce a D-T thermonuclear fusion reaction within the cylinder chamber, thereby providing an expandable fusion chamber which changes dimensions as a result of explosive shock wave forces of the D-T reaction.

Gas such as $CO_2$ is passed through the light tunnel 22 at 23 and is purged at 24 to keep the debris from pellet explosions from affecting the mirror lens 21.

A light and gas lock arrangement 125, described later with reference to FIG. 2, serves as a synchronously timed shutter which operates with a pellet loader by mechanically synchronized movement effected for example by linkages from the rotating crank arm 11 (not shown).

This engine is used for processing a gas charge within the expandable piston chamber such as $CO_2$ or a mixture thereof with nitrogen passing into the cylinder by intake valve 26 as flowing in through inlet pipe 25. When exposed to the pellet explosion with the transfer of energy from neutrons and plasmas, and the associated heat and shock, the $CO_2$ is dissociated into materials CO and $O_2$.

Intake valve 26 may be opened by a mechanically timed linkage from piston 16 as it starts a down stroke thereby to draw $CO_2$ into the expandable cylinder central fusion chamber by suction of the piston.

Figure 5:
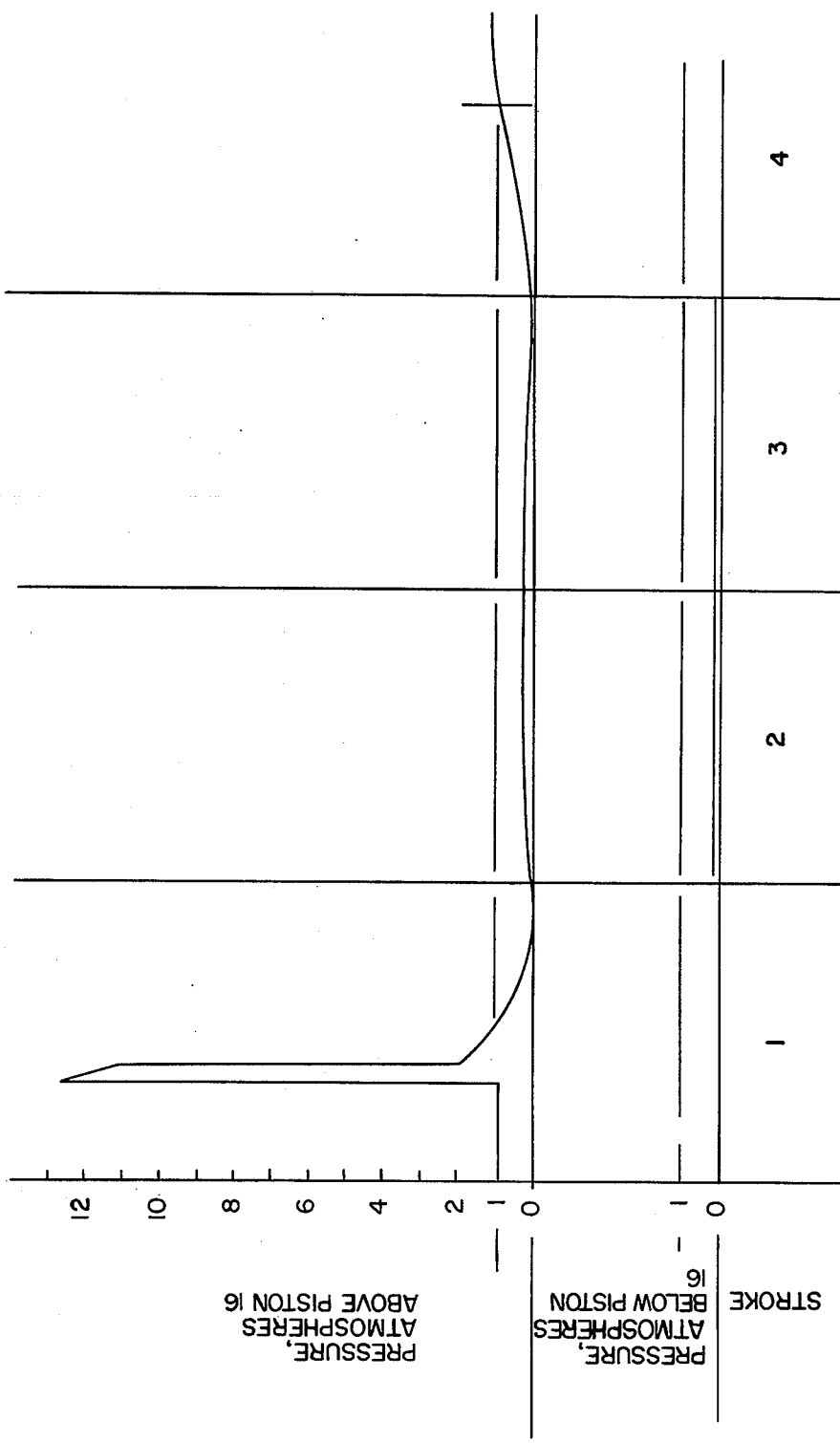
FIGS. 5 is a pressure diagram showing operational characteristics of the reciprocating engine afforded by this invention.
Figure 6:
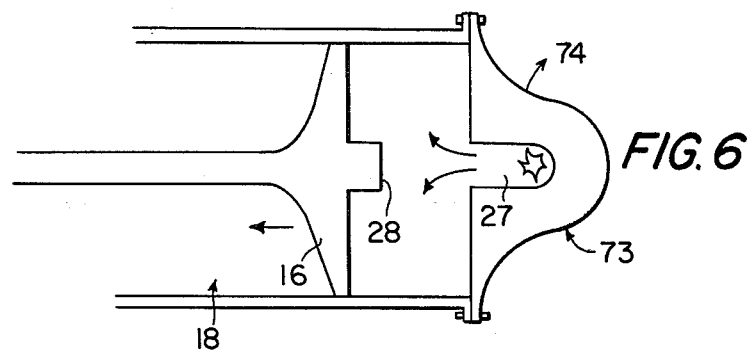
FIGS. 6, 6a and 6b show a feature of the piston as afforded by this invention for providing rapid volumetric expansion after the explosion of a pellet.
Figure 6A:
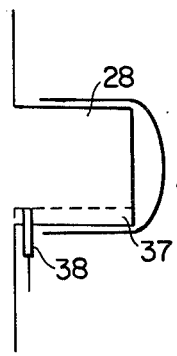
Figure 6B:
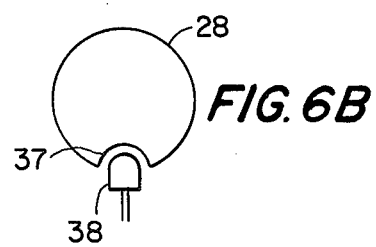

Note that the piston shape (as shown in FIG. 6) has a small top cylinder 27 and corresponding small piston portion 28. Gas flow is stopped just before the small piston portion 28 clears the small top cylinder 27 to provide a relatively small central chamber volume with a gaseous atmosphere at substantially atmospheric pressure in which a fusion pellet 19 is positioned and exploded. Thereafter the pressure in the small top cylinder rises sharply to about 15 atmospheres as shown in the pressure diagram of FIG. 5. The temperature because of the pellet explosion rises to about 3000° K.

The explosion force and accompanying shock wave will move piston 16 downwardly (to the left) within the cylinder a short distance where the small piston 28 clears the small top cylinder 27 to produce by a sudden enlargement a much larger volume cylinder space resulting in a very rapid drop of gas pressure and temperature as shown in FIG. 5. With the shown dimensions the gas expands from the $3\frac{1}{2}$ ft. (1.07 M) diameter small cylinder space into the larger 16 ft. (4.88 M) diameter larger cylinder space. At 120 r.p.m. the time it takes the large piston 16 to move one foot would be about 15 milliseconds. As the large piston moves through bottom dead center (shown in phantom) the expansion ratio is about 78 to one. This will approximately cool a gas from 3000° K. to about 1060° K. at about 0.09 atmosphere.

To further cool the gas in the cylinder to about 500° K., additional gas may be admitted to the cylinder after the explosion by means of valve 26 opening again on the downstroke of the power cycle (1). On the return stroke (the second one of four shown in FIG. 5), the exhaust valve 30 is opened and piston 16 pushes the gas out through heat exchanger 31. Also valves 32, 33 are opened to let the gas be sucked into the bottom of cylinder 18 below piston 16, while valve 34 remains closed. Slide valve 38 in FIG. 6, A and B, will be moved radially outwardly to a position external to the diameter of cylinder 27 after piston 28 has cleared cylinder 27 on stroke 1 of FIG. 5 and before piston 28 again reaches cylinder 27 on stroke 2 of FIG. 5. Passage 37 in piston 28 will thereby be opened except as needed to contain the pressure in cylinder 27 immediately following the explosion during stroke 1. Passage 37 will thereby allow the gas to be moved from the large diameter cylinder 18 into the small diameter cylinder 27 during strokes 2 and 4 of FIG. 5.

The next downward stroke (3) of the piston then pumps the gas below the piston 16 in cylinder 18 out through valve 33 with valve 32 open and valve 30 open so that it passes again through heat exchanger 31 and into the top of the expandable cylinder above the piston 16 for a further cooling cycle.

In the fourth and final cyclic stroke of the four-stroke cycle the piston rises with valves 30, 32 and 34 open and 33 closed to pump the gas out the exit 35 where CO and $O_2$ is recovered in dissociated form. In this operation the first stroke is different from the first stroke of a two-stroke Otto cycle, since intake of gas occurs during part of the stroke and the firing takes place in the same stroke.

FIG. 5 shows for both cylinder positions above and below the piston the pressure versus stroke position which is also pressure versus time for the gas during the four-stroke cycle in terms of atmospheres of pressure. Thus, the gas pressure is kept low during strokes 2 and 3 to avoid reheating the gas thereby to discourage any recombination tendency of CO with $O_2$. During the fourth stroke after the gas is cooled sufficiently, then the pressure is increased to slightly above one atmosphere for pumping gas out exit 35. The temperature is low enough so that this reheating will not seriously decrease the concentration of the $CO-O_2$ mixture by recombination.

Other engine embodiments could be visualized from that of this embodiment, which provides for four strokes per fusion fuel pellet explosion and self-pumping of the gas products being processed in and out of the central chamber by the piston in response to energy in the pellet explosion shock wave. In the present state of the art, from the dimensions shown and presently available pellets exploded by presently known laser techniques it is established that approximately 3000–5000 H. p. is generated per cylinder operating at 120 r.p.m.

It is a favorable condition of this aforedescribed mode of operation that the use of the shock wave energy as work in the movement of piston 16 and to dissociate $CO_2$ results in less impulse damage to the central chamber equipment than heretofore achievable with D-T reactions of this nature in fixed volume central chambers. Part of the energy is absorbed in the work on the gas and part in the mechanical movement so that less need be absorbed in chamber walls. Furthermore, the improved efficiency of production of a desired product in the form of a combustible fuel CO by reducing recombination by this method is important in development of a non-fossil source of energy.

Figure 2:
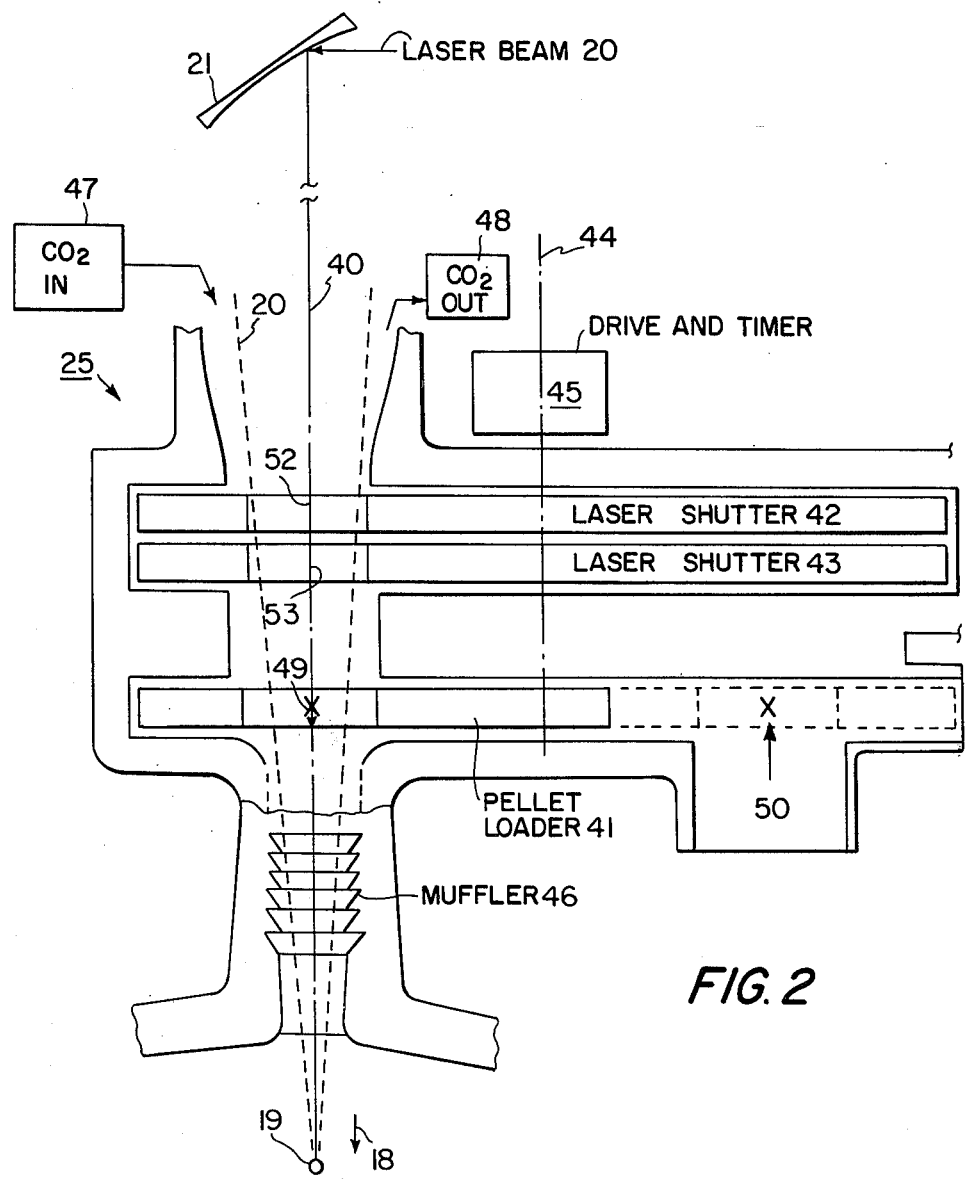
FIG. 2 is a sketch showing light, gas lock and pellet loading features of the invention.

In the light and gas lock section 25 of the engine, structure is used as shown in FIG. 2, consistent with entering the pellet and laser ignition energy into the shockwave environment encountered from the fusion process. Thus, laser energy in beam 20 enters along axis 40 to reach a pellet 19 in the central chamber cylinder 18.

To secure the chamber 18 against leakage from the D-T reaction while permitting entry of a pellet and an ignition laser pulse, the rotatable pellet loader 41 and laser shutters 42, 43 are timed in rotation along axis 44 by drive means 45 synchronously timed with the expansion engine operation, thus sealing off the back pressure waves otherwise tending to escape out the entrance passageway generally disposed about the axis 40.

The muffler 46, of a type suggested by A. P. Fraas, comprising a pipe with a sawtooth internal profile, is used to diffuse the shockwaves leaving the cylinder 18 as a result of the pellet explosion, thereby protecting the shutters, and generally reducing escape forces. Also the presence of the $CO_2$ within chamber 18 will also receive and absorb shock energy and convert it to the desired work products of dissociated CO and $CO_2$, to thus also aid in lessening shock on the light and gas lock assembly 25.

As before explained, a flow of $CO_2$ gas from a source 47 into the gas lock passageway and out through an exhaust 48 will tend to purge the gas lock of any residual debris that escapes from the chamber 18 before it can reach the mirror 21.

The gas and light lock 25 therefore remains closed except to admit briefly a laser firing pulse to explode pellet 19. The rotating shutters close the lock so rapidly that the shock wave from the pellet 19 will not be able to pass any substantial impulse energy out through the gas and light lock 25.

Figure 3:
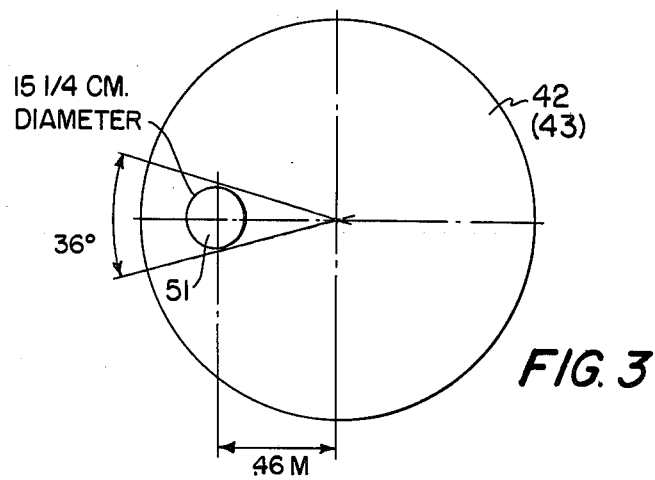
FIGS. 3 and 4 illustrate shutter and pellet loader features of the invention.
Figure 4:
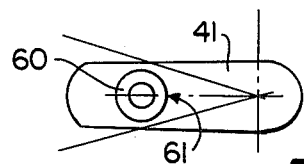

The light shutter 42, 43 construction is shown in FIG. 3, and the pellet loader 41 in FIG. 4. For 120 r.p.m. operation of the expansion engine, a pellet which is loaded onto the pellet loader member at 50, is placed along axis 40 at 49 once per second by rotation of pellet loader member 41, and is introduced along the axis 40 to position at 19 to coincide with the focal point of the laser beam 20 for explosion within chamber 18.

Aperture 51 of the upper and lower laser shutters 42, 43 is also positioned along the axis 40 at 52, 53 after the corresponding pellet loader member 41 is presented at 49 to discharge the pellet early enough from a position 60 by a cammed mechanism 61 or the like so that it arrives at the focal point 19 at the instant the laser beam is admitted and focussed there, with member 41 moving out of interfering position.

To provide rapid sealing of the laser gas lock 25 the shutters 42 and 43 are rotated at different speeds. Thus, with the upper shutter 42 rotating at 250 RPS (15000 RPM) and the lower shutter 43 rotating at 240 RPS the apertures 51 in each shutter coincide 10 times per second, and one of those coincidences is at the axis 40, resulting in one clear opening per second at 40. With the aperture 51 of diameter 6 inch (15¾ cm) the shutters cover no more than one-tenth of the circumferential distance and thus the opening is rapidly closed after the igniting laser impulse is admitted and before the shock wave from the pellet explosion can reach the shutters.

Thus, the opening 51 of shutter 42 moves at a 2356 ft./sec. (718 M/S) average speed passing over the axis 40 in about 212 microseconds. With a 10 ft. (3 M) distance from the pellet 19, the blast wave would have to move at 47100 ft./sec. 14356 M/S) in order to reach the shutter opening 52 before it closes, a speed roughly of Mach 50, not taking into account any retardation by muffler 46.

By adding shutter 43, the shutter remains closed for an entire second rather than opening every 0.004 sec. The shutters are about 4 inches (10 cm) thick so that they can resist a blast wave.

In order to process $CO_2$ for the purposes of this invention to obtain CO by dissociation the known technology from previous experimental studies is used which shows that $CO_2$ dissociates rapidly at temperatures in the range of 3000° K. and above. Also nitrogen and oxygen have been shown to combine rapidly at temperatures in the order of 3000° K. to form nitric oxide (NO). Other studies show that the degree of dissociation of $CO_2$ reaches the range of 75% in a container of initial pressure of 4 to 25 torr when subjected to electrical discharges or heating. Also in a fusion process the nuclear plasma and shock wave will contribute to dissociation of a gas. The nitrogen is preferably used to scavenge some of the $O_2$ released from dissociation to prevent recombination. The NO and $NO_2$ may inhibit chemically the recombination of carbon monoxide and oxygen thereby increasing the net yield of carbon monoxide. In accordance with this invention also rapid cooling and quenching is important since recombination is much more rapid at higher temperatures and pressures.

Also for cooling it is desirable to increase the ratio of the specific heat at constant pressure to the specific heat at constant volume (the gamma) of the $CO_2$ products, which at 3000° K. is about 1.1. With a 90% mixture of nitrogen and 10% $CO_2$ this is increased to 1.2, thereby permitting also more rapid cooling and quenching than with solely $CO_2$ products. Thus by a mixture cooling is greater, back reaction is reduced and a by-product $NO_2$ or nitric acid can be produced as a valuable fertilizer or chemical material. Thus, both NO and CO can be simultaneously produced with advantageous side benefits in the CO process.

If water or aqueous solution is circulated in cooling jackets surrounding cylinder 18 and is thereby used to obtain $H_2$ by undergoing radiolysis by absorption of fast neutron energy it is also desirable to mix with the water or solution a gas that provides bubbles in the water for shock absorption purposes to reduce shock impulse mechanical damage to the central chamber and remainder of the engine. Such a solution could be borated water with gas bubbles circulated in the piston and cylinder walls. Such fluids are introduced and circulated by the pipes 70 and 71 of FIG. 1 which are journalled to move with piston rod 12 by means of joint 72, and also by means of the pipes 73 and 74 to the cylinder jackets.

Adding small amounts of carrier water when NO is produced helps in removal of any unburned tritium from the pellet explosion from the central chamber products as $TNO_3$.

By operating at nearly atmospheric pressure in small cylinder 27 until the pellet is ignited, pressure locks, particularly in the introduction of the laser-fusion pellet are avoided to substantially simplify operation. Note that the nearly one atmosphere pressure just indicated is also shown in the first part of stroke 1 of FIG. 5.

Because laser pellet explosions are sequential in nature, the mechanical expansion engine of this invention produces an advantageous combinational advantage of converting discontinuous explosions into a directly useable mechanical form with attendant synergistic results of efficiently providing output products, quenching, self-pumping, and absorbing shock energy for longer chamber life.

Figure 7:
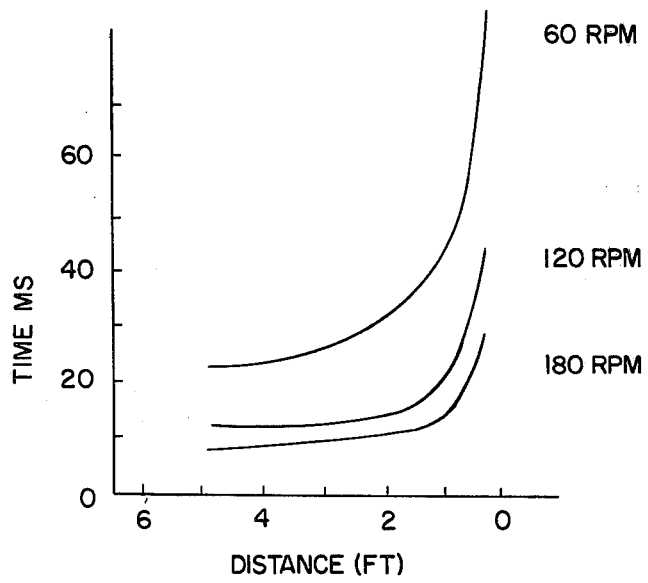
FIG. 7 is a timing diagram relating the time in milliseconds required to develop one-foot piston clearance for quenching hot gas.

FIG. 7 is a graph showing on the abscissa the distance in feet of piston clearance and on the ordinate the time in milliseconds for three different engine speeds. Thus, the 120 r.p.m. embodiment requires only about 0.015 second to develop one foot of piston clearance so that the larger cylinder portion shown in FIG. 6 can be reached very rapidly for the quenching operation. A higher speed engine (180 r.p.m.) adds little advantage for the purpose of quenching and the engine preferably operates at 120 r.p.m. to reduce internal stresses.

Figure 8:
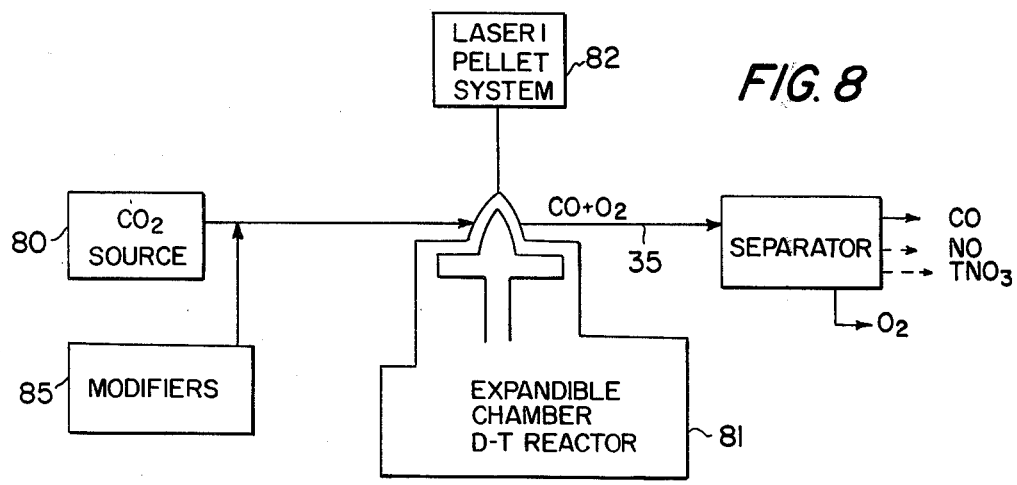
FIG. 8 is a system diagram showing the processing of a gaseous raw material through a fusion operated reciprocating engine to recover dissociated parts thereof.

As seen in the general product processing system view of FIG. 8, a $CO_2$ source 80 provides at the expandable chamber D-T reactor 81 a $CO_2$ raw material charge which is dissociated into CO and $O_2$ by a reaction induced by the laser-pellet system 82. Separator 83 then produces the desired output combustible gas CO from the resulting quenched mixture at outlet line 35. As before explained, modifiers such as nitrogen and water can be entered by the modifier section 85 to produce additional output ingredients NO, $TNO_3$, etc.

Previous technology known in the development of this invention includes a line of development evidenced by a number of fusion patent applications now pending or issued by the assignee of this case as directed toward production by fusion techniques of combustible fuels, including processing of $H_2O$ to obtain $H_2$ and $CO_2$ to obtain CO. Also certain background work in the use of laser energy and pellets to produce D-T reactions as developed by KMS Fusion, Inc. and others is known and utilized in the development of this invention. In addition to references of prior developments hereinbefore also published literature in the field is known to be related to at least separate techniques or elements of this invention as follows:

Andreev, Yu. P., Voronkov, Yu., and Semiokhin, I. "Dissociation of Carbon Dioxide in a Pulse Discharge," *Russian J. of Phys.*, 49, 5 (1975), 691–93. (AndrY75a)

Brabbs, T.A., Belles, F., and Zlatarich, S. "Shock-Tube Study of Carbon Dioxide Dissociation Rate," *J. Chem. Phys.*, 38 (1963), 1939–44. (BrabT63)

Brown, L.C. and Bell, A. "Kinetics of the Oxidation of Carbon Monoxide and the Decomposition of Carbon Dioxide in a Radiofrequency Electric Discharge. I-Experimental Results," *Ind. Eng. Chem. Fund*, 13 (1974), 203–09.

"II-Theoretical Interpretation," Ibid., 210–18.

Day, C., et al. *Perry's Chemical Engineers Handbook*, 4th Ed. New York: McGraw Hill, 1963.

Dean, A. "Dissociation of Carbon Dioxide behind Reflected Shock Waves," *J. Chem. Phys*, 58, 12 (1973), 5202–08.

Dean, A. and Steiner, D. "A Shock Tube Study of the Recombination of Carbon Monoxide and Oxygen Atoms," *J. Chem. Phys.*, 66, 2 (1977), 598–604. (DeanA76).

Fraas, A. P. "The Blascon-an Exploding Pellet Fusion Reactor," ORNL-TM-3231, Oak Ridge, July 1971. a.

"Pulsed Laser-Ignited Thermonuclear Reactor," U.S. Pat. No. 3,624,239, November 30, 1971. b.

"Conceptual Design of a Series of Laser-Fusion Power Plants of 100 to 3000 Mw(e)," 9th Intersoc. Energy Conv. *Engr. Conf. Proc.* 749078, ASME, N.Y., 1974, 738–47.

Glick, H.S., Klein, J., and Squire, W. "Single-Pulse Shock Tube Studies of the Kinetics of the Reaction $N_2+O_2\rightleftharpoons 2NO$ between 2000°–3000° K.," *J. Chem. Phys.*, 27, 4 (1957), 850–57. (GlicH57)

Gordon, S. and McBride, B. "Preliminary Description of CEC71, a Computer Program for the Calculation of Chemical Equilibrium Compositions with Applications," Lewis Research Center, NASA, Nov. 6, 1970.

Greene, E. and Toennies, J. *Chemical Reactions in Shock Waves*. New York: Academic Press, 1964.

Hart, E., McDonnell, W., and Gordon, S. "The Decomposition of Light and Heavy Water Boric Acid Solutions by Nuclear Reactor Radiations," *Proc. First UN Intern. Conf.*, PUAE, 7, Geneva (1956), 593–98. (HartE56a)

Harteck, P. and Dondes, S. "Radiation Chemistry of Gases P/1769 (USA)," *Proc. Second UN Intern. Conf. PUAE*, 29, September 1958, 415–19. (HartP-58a)

Hertzberg, A. "Nitrogen Fixation for Fertilizers by Gasdynamic Techniques," Preprint, 1968. (HertA68)

Lewis, B. and von Elbe, G. *Combustion, Flames and Explosions of Gases*, 2nd Edition. New York: Academic Press, 1961.

Lubin, M. J. and Fraas, A.P. "Fusion by Laser," *Sci. Amer.*, 224 (1971), 21.

Stull, D. R. and Prophet, H., et al. "JANAF Thermochemical Tables, 2nd Edition," NSRDS-NBS 37, U.S. Government Printing Office, 1971.

Zel'dovich, Ya. and Raizer, Yu. *Physics of Shock Waves and High-Temperature Hydrodynamic Phenomena*. New York: Academic Press, 1966.

Zeleznik, F. J. and McBride, B. J. "Modeling the Complete Otto Cycle-Preliminary Version," SAE International Automotive Engineering Congress and Exposition, Paper 770223. Detroit, Michigan, 1977.

I claim:

1. The method of converting the expansive forces, shockwave, thermal and plasma energy of a fusion reaction within a chamber to useable energy forms wherein the chamber has smaller primary and larger secondary cylinder spaces of different diameters separated by a movable piston which leaves the smaller chamber volume thereby exposing the larger secondary chamber volume to increase chamber volume as a step function comprising the steps of:

inducing the reaction in said smaller dimension primary reactive chamber volume, expanding by the shockwave energy of the reaction chamber dimension to said larger dimension secondary cylinder space volume by moving the piston out of the smaller cylinder space, and cooling gases developed by the reaction by means of the step function increase in chamber volume.

2. The method of claim 1 including the step of inducing said reaction in the primary chamber in the presence of a gas which absorbs radiation from said reaction.

3. The method of claim 2 wherein said gas is $CO_2$, wherein radiolysis of the fusion reaction dissociates $CO_2$ to CO and $O_2$ and said step function of expanding chamber volume rapidly cools the residue gases thereby increasing yield of said dissociated CO by inhibiting recombination of CO and $O_2$.

4. The method of claim 2 including the step of mixing nitrogen with the $CO_2$ before said reaction.

5. The method of claim 4 including the step of introducing water to the gas mixture and recovering $TNO_3$ after said reaction.

6. The method of claim 4 including the step of recovering NO after said reaction.

7. The method of claim 2 wherein additional gas is drawn into said reactive chamber after said fusion reaction.

8. The method of claim 1 including the step of driving cyclically operable moving means by the shock energy of said fusion reaction.

9. The method of claim 8 including the step of pumping gas in and out of said chamber by said cyclically moving means.

10. The method of claim 8 including the steps of operating said moving means through a single power stroke cycle by inserting fusion fuel and exploding said fuel.

11. The method of claim 1 including the step of protecting chamber walls from the shock wave of the explosive reaction by absorbing energy from the reaction by dissociating a gas, and converting the shock wave into a movable power stroke displacing said piston.

12. The method of claim 1 comprising the steps of sequentially feeding fuel pellets to said chamber cyclically, and inducing with each corresponding explosion a cyclically repetitive movement timing the feeding of a subsequent fuel pellet.

13. A cyclically operable moving mechanism powered by sequential fusion reactions within a confined chamber, comprising in combination, a chamber having smaller primary and larger secondary cylinder spaces of different diameters, a piston reciprocally movable within said chamber out of the smaller and into the larger space, means periodically presenting fusion fuel pellets within said chamber, and means for exploding said pellets in said chamber to thereby reciprocate said piston with the shock wave energy surrounding the explosion.

14. A mechanism as defined in claim 13 wherein the means for exploding the pellets is means providing a laser beam at the pellet location within the cylinder, and shutter means operable to open a passage for entry of said laser beam momentarily to explode the pellet, and thereafter closing the passage for confining the shock wave energy of the explosion within the chamber.

15. A mechanism as defined in claim 13 including means introducing a gaseous material within said chamber for presence therein during said explosion.

16. A mechanism as defined in claim 15 including means for expanding the chamber volume significantly shortly after the explosion thereby to cool the gaseous material by rapid volume expansion.

17. A mechanism as defined in claim 13 having a two-diameter piston reciprocating in said chamber and journalled by the cylinder walls about both piston sizes thereby producing a smaller explosion chamber and a larger volume expansion chamber, and means introducing a working medium selectively into the chamber on either side of the piston.

18. A mechanism as defined in claim 17 having a four cycle operation mode with a fuel pellet exploded each second piston reciprocation, said cycles comprising (a) loading the fusion fuel and a gaseous surrounding for an expansion cycle rapidly cooling the gaseous residues in the chamber after explosion, (b) a pumping cycle clearing residues out of the explosion chamber on the return piston compression after an explosion, and into the remaining chamber on the opposite side of the chamber, (c) means pumping the residues out of said opposite side of the chamber in a second expansion cycle and drawing the working medium into the explosion chamber, and (d) pumping the medium out of the explosion chamber on the second compression cycle, thereafter repeating said for cycles in the same sequence.

* * * * *